(12) United States Patent
Lenczowski et al.

(10) Patent No.: US 12,315,966 B2
(45) Date of Patent: May 27, 2025

(54) CARBON NANOTUBES REINFORCED BIPOLAR PLATE

(71) Applicants: Airbus Operations, S.L., Madrid (ES); Airbus Operations GmbH, Hamburg (DE); Airbus (S.A.S.), Blagnac (FR)

(72) Inventors: Blanka Lenczowski, Neubiberg (DE); Tamara Blanco Varela, Getafe Madrid (ES); Peter Linde, Buxtehude (DE)

(73) Assignees: Airbus (S.A.S.), Blagnac (FR); Airbus Operations S.L., Madrid (ES); Airbus Operations GmbH, Hamburg (DE)

( * ) Notice: Subject to any disclaimer, the term of this patent is extended or adjusted under 35 U.S.C. 154(b) by 517 days.

(21) Appl. No.: 17/946,474

(22) Filed: Sep. 16, 2022

(65) Prior Publication Data

US 2023/0094636 A1 Mar. 30, 2023

(30) Foreign Application Priority Data

Sep. 24, 2021 (EP) ..................................... 21382857

(51) Int. Cl.
*H01M 8/0228* (2016.01)
*B32B 3/30* (2006.01)
(Continued)

(52) U.S. Cl.
CPC .............. *H01M 8/0228* (2013.01); *B32B 3/30* (2013.01); *B32B 5/12* (2013.01); *B32B 5/26* (2013.01);
(Continued)

(58) Field of Classification Search
CPC .............. H01M 8/0228; H01M 8/0213; H01M 8/0221; H01M 8/0226; H01M 8/026; H01M 8/0263; H01M 8/1004; H01M 8/241; H01M 8/2484; H01M 2250/20; H01M 2008/1095; H01M 8/0239; H01M 8/0243; H01M 8/0245; H01M 8/0234; H01M 8/0265; B32B 3/30; B32B 5/12; B32B 5/26; B32B 2250/20; B32B 2255/02; B32B 2255/20; B32B 2260/023; B32B 2260/046;
(Continued)

(56) References Cited

U.S. PATENT DOCUMENTS

2012/0292439 A1  11/2012  Hallander et al.

FOREIGN PATENT DOCUMENTS

CN     112 501 906 A     3/2021

OTHER PUBLICATIONS

Hwang I.U. et al, "Bipolar plate made of carbon fiber epoxy composite for polymer electrolyte membrane fuel cells", Journal of Power Sources, Elsevier, Amsterdam, NL, Sep. 15, 2008, vol. 184, No. 1, pp. 90-94.
(Continued)

Primary Examiner — Helen Oi K Conley
(74) Attorney, Agent, or Firm — KDW Firm PLLC

(57) ABSTRACT

A bipolar plate for a proton exchange membrane fuel cell includes a laminate of carbon fiber reinforced plastic (CFRP) with a first outer ply. The CFRP includes a resin and carbon fibers. The first outer ply is arranged at a first lateral surface of the laminate, wherein the laminate includes a first plurality of carbon nanotubes (CNTs). The first outer ply includes a first groove, wherein the first groove is configured to define a first gas diffusion channel. At least some of the first plurality of CNTs extend through the first outer ply in a direction transversely to the first lateral surface of the laminate.

15 Claims, 6 Drawing Sheets

(51) Int. Cl.
  *B32B 5/12* (2006.01)
  *B32B 5/26* (2006.01)
  *B64D 27/24* (2006.01)
  *H01M 8/0213* (2016.01)
  *H01M 8/0221* (2016.01)
  *H01M 8/0226* (2016.01)
  *H01M 8/026* (2016.01)
  *H01M 8/0263* (2016.01)
  *H01M 8/1004* (2016.01)
  *H01M 8/241* (2016.01)
  *H01M 8/2484* (2016.01)

(52) U.S. Cl.
  CPC .......... *B64D 27/24* (2013.01); *H01M 8/0213* (2013.01); *H01M 8/0221* (2013.01); *H01M 8/0226* (2013.01); *H01M 8/026* (2013.01); *H01M 8/0263* (2013.01); *H01M 8/1004* (2013.01); *H01M 8/241* (2013.01); *H01M 8/2484* (2016.02); *B32B 2250/20* (2013.01); *B32B 2255/02* (2013.01); *B32B 2255/20* (2013.01); *B32B 2260/023* (2013.01); *B32B 2260/046* (2013.01); *B32B 2262/106* (2013.01); *B32B 2457/18* (2013.01); *H01M 2250/20* (2013.01)

(58) Field of Classification Search
  CPC .......... B32B 2262/106; B32B 2457/18; B64D 27/24; B64D 27/355; Y02E 60/50
  See application file for complete search history.

(56) References Cited

OTHER PUBLICATIONS

Mohd Radzun Nabilah Afiqah et al, "Fibre orientation effect on polypropylene/milled carbon fiber composites in the presence of carbon nanotubes or graphene as a secondary filler: Application on PEM fuel cell bipolar plate", International Journal of Hydrogen Energy, Elsevier, Amsterdam, NL, Feb. 4, 2019, vol. 44, No. 58, pp. 30618-30626.

Chen Guowei et al, "Progress in research and applications of Polyphenylene Sulfide blends and composites with carbons", Elsevier, Amsterdam, NL, Dec. 13, 2020, vol. 209.

European Search Report for Application No. 21382857 dated Mar. 1, 2022.

CARBON NANOTUBES REINFORCED BIPOLAR PLATE

CROSS-REFERENCE TO RELATED APPLICATION

This application claims priority to EP 21382857.7 filed Sep. 24, 2021, the entire disclosure of which is incorporated by reference herein.

TECHNICAL FIELD

The disclosure herein relates to a bipolar plate, a proton exchange membrane fuel cell, a fuel cell stack, a method for manufacturing a bipolar plate and an aircraft comprising a fuel cell.

BACKGROUND

A fuel cell is an electrochemical cell that converts the chemical energy of a fuel, for example hydrogen, and an oxidizing agent, for example oxygen, into electricity through a pair of redox reactions. Fuel cells are different from most batteries in requiring a continuous source of fuel and oxygen, usually from air, to sustain the chemical reaction, whereas in a battery the chemical energy usually comes from metals and their ions or oxides that are commonly already present in the battery. The components of a fuel cell are typically an anode, a cathode, a membrane and bipolar plates. To function, the membrane must conduct hydrogen ions, protons in a proton exchange membrane fuel cell, but not electrons. The membrane must also not allow either gas to pass to the other side of the cell, a problem known as gas crossover. Furthermore, the membrane must be resistant to the reducing environment at the cathode as well as the oxidative environment at the anode.

The bipolar plates may be made of different types of materials, such as, metal, coated metal, graphite, flexible graphite, C—C composite or carbon-polymer composites like CFRP. Bipolar plates made of CRFP offer several advantages compared to other materials, for example a low density. Compared to bipolar plates made of metal, bipolar plates made of CFRP have a reduced thermal and electrical conductivity and less compressive and transverse strength.

SUMMARY

There may be a need to improve usability of bipolar plates made of CFRP for proton exchange membrane fuel cells.

The object of the disclosure herein is solved by the subject-matter and embodiments disclosed herein.

According to the disclosure herein, a bipolar plate for a proton exchange membrane fuel cell comprises a laminate of carbon fiber reinforced plastic, CFRP. The CFRP comprises a resin and a plurality of carbon fibers. The laminate comprises a first outer ply defining preferably a resin rich layer with a decreased percentage of carbon fibers. The first outer ply is arranged at a first lateral surface of the laminate. The laminate comprises a first plurality of carbon nanotubes, CNTs, arranged within in the resin. The first outer ply of the laminate comprises a first groove, wherein the first groove is configured to define a first gas diffusion channel for the reactants needed for the chemical reaction. At least some of the first plurality of CNTs extend through the first outer ply in a direction transversely to the first lateral surface of the laminate. At least some is preferably a percentage more than 50%, even more preferably 70%, even more preferably 90%, most preferably close to 100%.

The bipolar plate separates reactant gases and distributes them via the gas diffusion channels to an anode or a cathode of a fuel cell. The bipolar plates further carry the compressive strength, due to the fact, that the proton exchange fuel cell, is mostly part of a fuel cell stack that is placed under compression. The compression is substantially to ensure tightness against gas leakage of the reactants. The gas diffusion channels result in resin and parts of the carbon fibers of the CFRP to be removed and the remaining material is subjected to increased stress.

Structurally CFRP are composite materials, wherein the composite consists of or comprises a matrix and a reinforcement. In CFRP the reinforcement is carbon fiber, which provides its strength. The matrix is usually a polymer resin, such as epoxy, to bind the reinforcements together. Because CFRP consists of two distinct elements, the material properties depend on these two elements.

To increase transverse strength, transversely to surface of the laminate oriented carbon nanotubes, CNTs, are placed in the resin of the laminate with a chemical process. CNTs are tubes made of carbon with diameters typically measured in nanometers and are the strongest and stiffest materials yet discovered in terms of tensile strength and elastic modulus. The CNTs are substantially parallel to each other and at least some of the CNTs extend through the first outer ply.

The gas diffusion channels are realized by a first groove in the first outer ply. The first groove results in a reduced surface area of the laminate, defined by the course of the groove and a remaining surface area, wherein the remaining surface area is strengthened in the transverse direction by the CNTs. The percentage of the reduced area, defined by the first groove 22 is preferably at least 50%.

According to an example, the laminate comprises a second outer ply, wherein the second outer ply is arranged at a second lateral surface of the laminate. The second outer ply comprises a second groove, wherein the second groove is configured to define a second gas diffusion channel for a second reactant. At least some of the plurality of CNTs extend through the second outer ply in a direction transversely to the second lateral surface of the laminate.

The structure of the second outer ply is substantially identical to the structure of the first outer ply. The course of the second groove may be similar to the course of the first groove. The course of the second groove may be different to the course of the first groove. The thickness of the second outer ply may be similar or different to the thickness of the first outer ply.

According to an example, at least some of the plurality of CNTs extend to the first lateral surface and/or the second lateral surface of the laminate. The first or second lateral surface of the laminate may be treated with a surface finishing to remove protruding CNTs to improve tightness against gas leakage.

According to an example, the length of at least some of the plurality of CNTs correspond to the depth of the first groove and/or the second groove. A length corresponding to the depth of the first groove results in a contact of the CNTs and the carbon fibers whereby the distribution of forces in the transverse direction within the laminate is improved. A thickness of the first outer ply, and the corresponding resin rich layer, corresponding to the depth of the first groove results in improved manufacturing conditions, because less carbon fibers with a different material characteristic to resin need to be removed. Therefor a length of the CNTs improves manufacturing and the compressive and transverse strength of the laminate.

According to an example, at least some of the first plurality of CNTs extend through the first outer ply and/or the second outer ply in a direction perpendicular to the first lateral surface and/or the second lateral surface of the laminate. A high percentage of CNTs perpendicular to the first and/or second lateral surface of the laminate result in a improved distribution of forces. Preferably the percentage of perpendicular CNTs of the first plurality is more than 70%, more preferably 80%, even more preferably 90%, most preferably close to 100%.

According to an example, the laminate further comprises a second plurality of CNTs, preferably arranged in a first inner ply, wherein in the first inner ply is arranged beneath the first outer ply. The second plurality of CNTs is oriented substantially parallel to the first lateral surface and/or the second lateral surface. Preferably the length of the CNTs of the second plurality extends over the whole laminate. The second plurality of CNTs is advantageous, because bipolar plates should be electrically conductive and highly thermally conductive for heat transfer across the fuel cell, wherein the bipolar plates need to lead away heat from the electro chemical process. Typical operating temperatures of fuel cell are between 60-80° C., and for high temperature fuel cells some 120-200° C. To improve the conductivity within the bipolar plate, the material needs conducting elements in the plane of the material. CNTs are known to be conducting. The second plurality of CNTs may be oriented in a particular direction and thus cause the thermal conductivity in the material to improve strongly in that direction.

According to an example, the laminate further comprises a third plurality of CNTs, preferably arranged in a third outer ply, wherein in the third outer ply is arranged beneath the second outer ply. The third plurality of CNTs is oriented substantially parallel to the first lateral surface and/or the second lateral surface of the laminate. The orientation of the third plurality of CNTs is different to the orientation of the second plurality of CNTs. A laminate can be stacked with two or more plies containing CNT fibers in different directions for electrical conductivity in one or several directions, to improve the heat transfer.

According to an example, the bipolar plate further comprises a graphene enhancement, wherein the graphene enhancement is carried out by spraying, dispersing or by mixing graphene flakes into the resin. It has been shown that it is possible to improve the thermal conductivity of CFRP by CNTs or by adding graphene, which is a single layer of carbon atoms, arranged in a two-dimensional honey-comb lattice, wherein a few layers are used. The graphene enhancement improves the thermal and electrical conductivity of the bipolar plate.

According to an example, the first groove and/or the second groove runs in a serpentine manner. The serpentine manner may be selected from the group, consisting of parallel serpentine, Spiral serpentine, parallel murray branching, leaf-like interdigitated, interdigitated, parallel, parallel, grid, lounge-like interdigitated, or leaf like.

According to an example, the cross-section of the first groove or the second groove is selected from a group consisting of square, rectangular, trapezoidal, parallelogram, triangular.

According to the disclosure herein, a proton exchange membrane fuel cell comprises an anode, a membrane, a cathode, a first bipolar plate and a second bipolar plate, wherein the bipolar plates are reinforced with carbon nanotubes. The anode and the cathode are connected via a conductor, wherein the conductor is preferably connectable to a consumer or an element for storing electrical energy. The first bipolar plate is adapted to guide a first reactant to the anode, and the second bipolar plate is adapted to guide a second reactant to the cathode, such that the first reactant and the second reactant react via the membrane by generating electrical energy.

The bipolar plate for the proton exchange membrane fuel cell, comprises a laminate of CFRP with a first outer ply and a first plurality of carbon nanotubes, CNTs, arranged within in the resin of the CFRP. The first outer ply of the laminate comprises the gas diffusion channels for the reactants needed for the chemical reaction. At least some of the first plurality of CNTs extend through the first outer ply in a direction transversely, preferably perpendicular, to the first lateral surface of the laminate and increase the resistance to compressive strength of the contact area of the bipolar plate to the adjacent entities.

According to the disclosure herein, a fuel cell stack comprises a plurality of proton exchange membrane fuel cells. The proton exchange membrane fuel cells each comprise an anode, a membrane, a cathode, a first bipolar plate and a second bipolar plate, wherein the second bipolar plate of a fuel cell is equivalent to the first bipolar plate of a consecutive fuel cell. The bipolar plates comprise a laminate of CFRP with carbon nanotubes, CNTs, arranged within in the resin of the CFRP to improve compressive and transverse strength.

The fuel stack further comprises an inlet manifold for a first reactant, an outlet manifold for the first reactant, and further comprises an inlet manifold for a second reactant and an outlet manifold for the second reactant. The first reactant is preferably hydrogen, and the second reactant is preferably oxygen. The fuel stack further comprises a first end plate and second end plate, wherein the first end plate and the second end plate are arranged parallel to the plies of the fuel cell on opposite sides. The inlet manifold and the outlet manifold for the first reactant are arranged at opposing or adjacent sides of the fuel stack. The fuel stack is interconnected under compression. The compression is necessary to keep the stack tight against gas leakage, wherein the compressive forces are introduced into the CNTs.

A bipolar plate is therefore a multi-functional component within a fuel cell stack. It connects and separates the individual fuel cells in series to form a fuel cell stack with required voltage, aids uniform distribution of fuel gas and oxygen over the whole active surface area, conducts electrical current from the anode of one cell to the cathode of the next, facilitates water management within the cell, supports thin membrane and electrodes and clamping forces for the stack assembly.

According to an example, the manifolds comprise a plurality of entries. The plurality of entries may be in the inlet manifold for the first reactant, and/or the outlet manifold for the first reactant, and/or the inlet manifold for the second reactant, and/or the outlet manifold for the second reactant.

According to the disclosure herein, a method for manufacturing a bipolar plate for a proton exchange membrane fuel cell comprises the following steps. In a first step a laminate of a carbon fiber reinforced plastic, CFRP; comprising a resin, a plurality of carbon fibers, and a first plurality of CNTs is provided. The laminate further comprises a first outer ply with a first lateral surface, wherein at least some of the first plurality of CNTs extend through the first outer ply in a direction transversely to the first lateral surface of the laminate. In a second step a laser is used to evaporate the first outer ply to form a first groove defining a gas diffusion channel for the reactants. The groove evaporated by the laser preferably has a depth of 0.05 mm.

According to the disclosure herein an aircraft comprises a fuel cell. The fuel cell may be used to provide energy to electrical consumers.

The objective of the disclosure herein is a bipolar plate made of CFRP, to reduce weight, with improvements in compressive and transverse strength by nanotubes extending in a direction transversely, preferably perpendicular, to the surface of the laminate. The interlaminar shear strength between plies and compressive strength transverse to the plane of a composite ply is improved, if CNTs are placed in the ply, which are oriented transverse to the plane of the ply.

The improved transverse strength enables increased gas diffusion channel area, which reduces weight, and improves electro chemical performance of the fuel cell. The electrical and thermal conductivity of CFRP bipolar plate is improved by CNT fibers, that can be added in desired directions. Furthermore, the electrical and thermal conductivity of CFRP bipolar plate is additionally improved by graphene enhancement. The lifetime/durability of the fuel cell is extended due to improved thermal conductivity and thermal expansion coefficients better aligned between the materials.

The technologies/processes can to some degree be extended to further parts of a fuel cell, such as the end plates, and/or the manifolds.

These and other aspects of the disclosure herein will become apparent from and be elucidated with reference to the embodiments described hereinafter.

BRIEF DESCRIPTION OF THE DRAWINGS

Example embodiments of the disclosure herein will be described in the following with reference to the following drawings.

DETAILED DESCRIPTION

Figure 1:
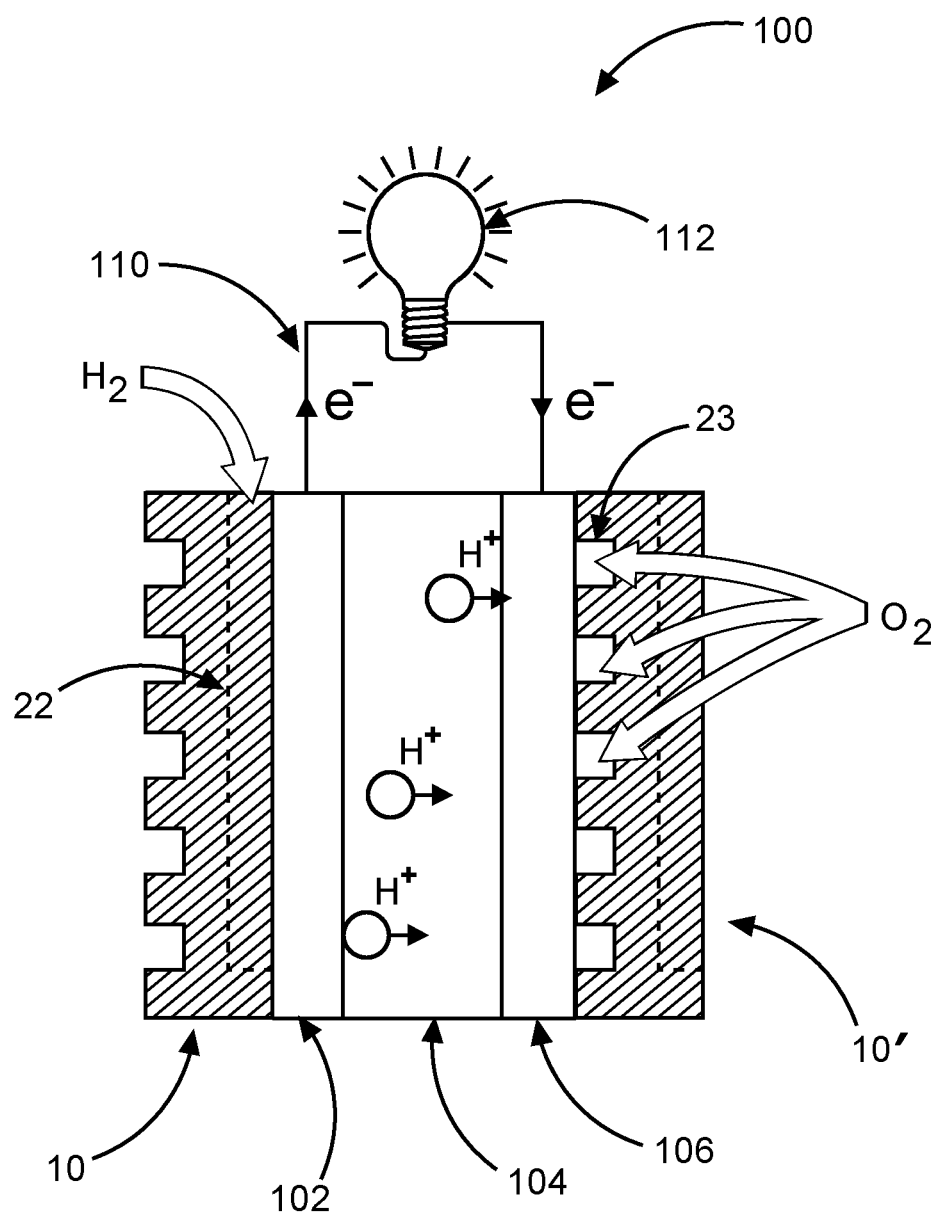
FIG. 1 shows a cross-section of a proton exchange membrane fuel cell, according to the disclosure herein.

FIG. 1 shows a typical cross-section of a proton exchange membrane fuel cell 100 comprising an anode 102, a membrane 104, a cathode 106, and a first bipolar plate 10 and a second bipolar plate 10'. In a fuel cell stack, shown in FIG. 6, a left bipolar plate 10 of a first fuel cell is identical to right bipolar plate 10' of a consecutive fuel cell. The anode 102 and the cathode 106 are connected via a conductor 110, wherein the conductor 110 is preferably connectable to a consumer 112 or an element for storing electrical energy (not shown). The first bipolar plate 10 is adapted to guide a first reactant, preferably pressurized hydrogen gas, $H_2$, to the anode 102 via a first groove 22, and the second bipolar plate 10' is adapted to guide a second reactant, preferably pressurized oxygen, $O_2$, to the cathode 106 via a second groove 23, such that the first reactant and the second reactant react within the membrane 104 by generating electrical energy. Outermost are seen the bipolar plates 10, 10', attached to the anode 102 and cathode 104 respectively, which are flanking the centrally located membrane 104. The first reactant enters through the first groove 22 in the left bipolar plate 10 leaving, positively charged protons being split, wandering through the membrane 104, whereby electrons transmit through the anode 102 to the conductor 110 and the electrical consumer 112 on the top. At the cathode 104 side the second reactant is entered to react with the protons. The electrons flowing down in the cathode 104 forming water and heat. Energy is won through the operation of e.g. an electrical consumer 112, closing the circuit, or by storing electrical energy.

Figure 2:
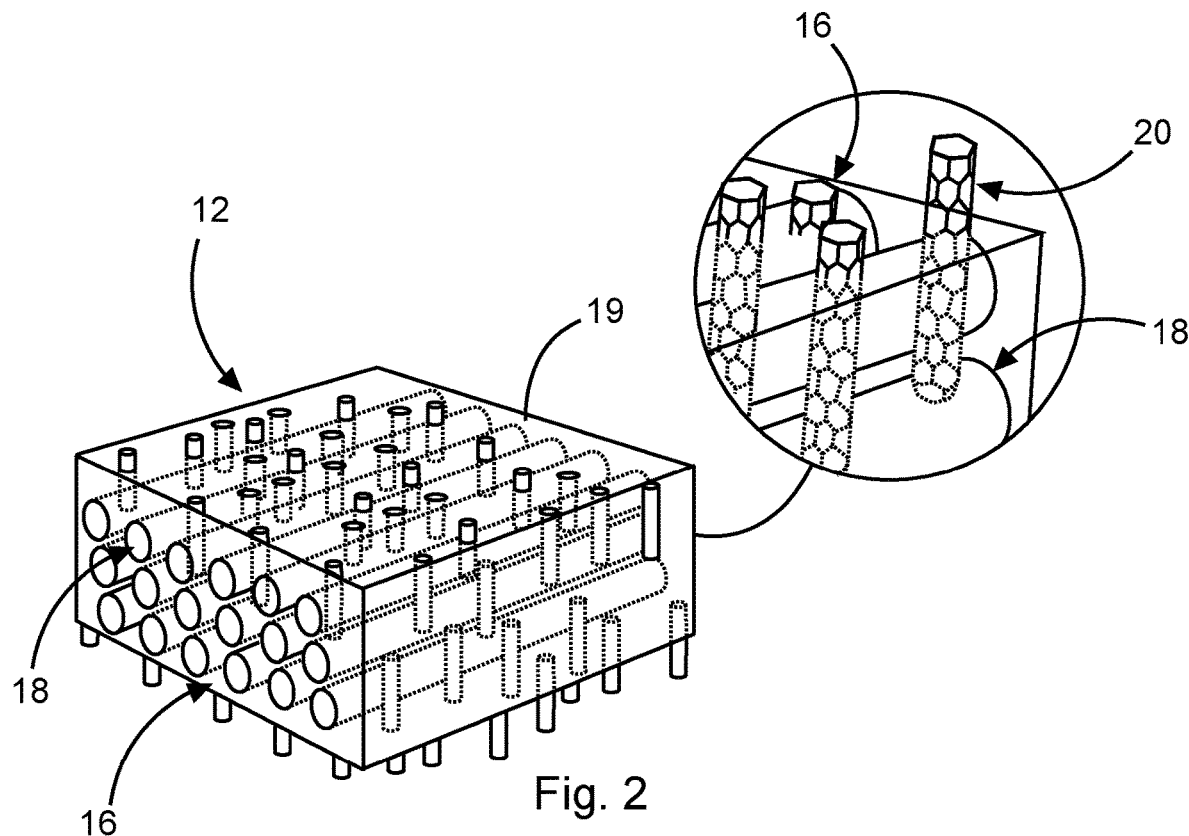
FIG. 2 shows a laminate of CFRP with a first plurality of CNTs, according to the disclosure herein.

FIG. 2 shows a laminate 12 of carbon fiber reinforced plastic, CFRP. The laminate 12 comprises a resin 16 and a plurality of carbon fibers 18. The laminate 12 comprises a first plurality of carbon nanotubes, CNTs 20, that extend through the laminate in a direction perpendicular to a first lateral surface 19 of the laminate. The upper right corner is shown in an enlarged view. Some of the CNTs 20 protrude to some extent vertically out of the resin 16 and contact the carbon fiber 18.

Figure 3:
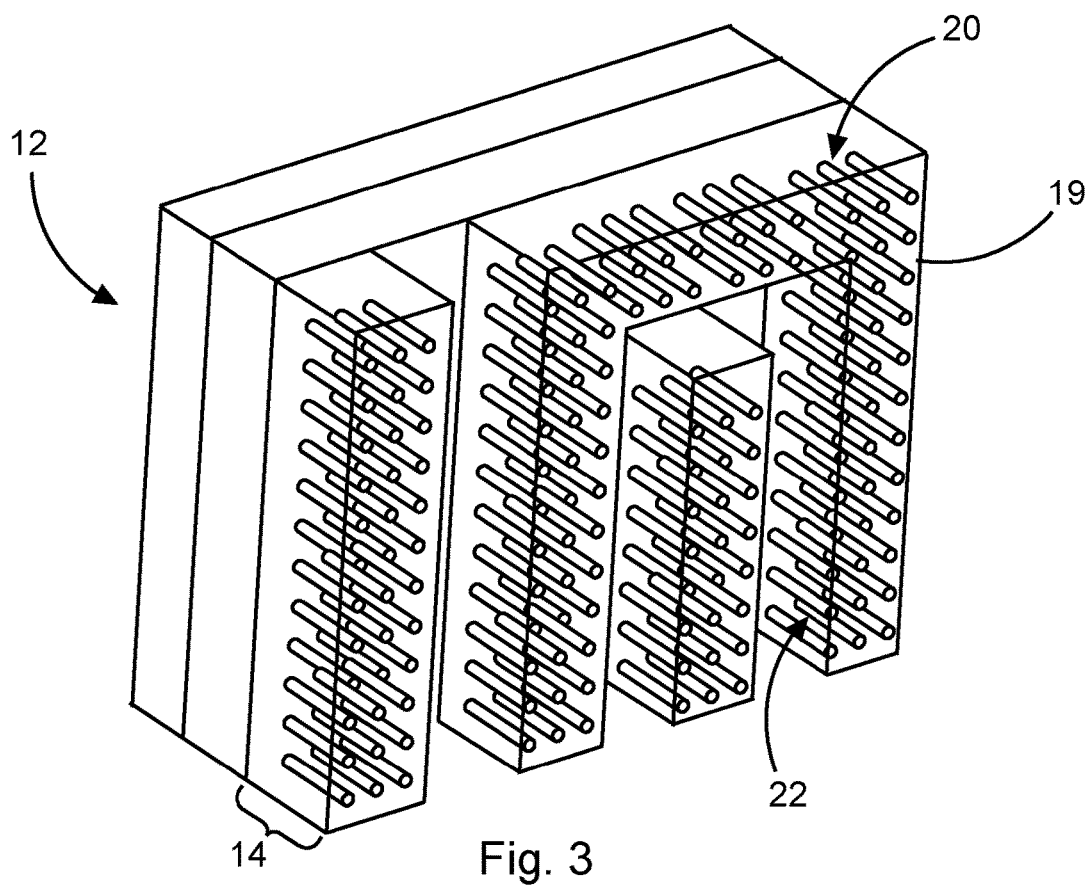
FIG. 3 shows the laminate of CFRP of FIG. 2 with gas diffusion channels, according to the disclosure herein.
Figure 4:
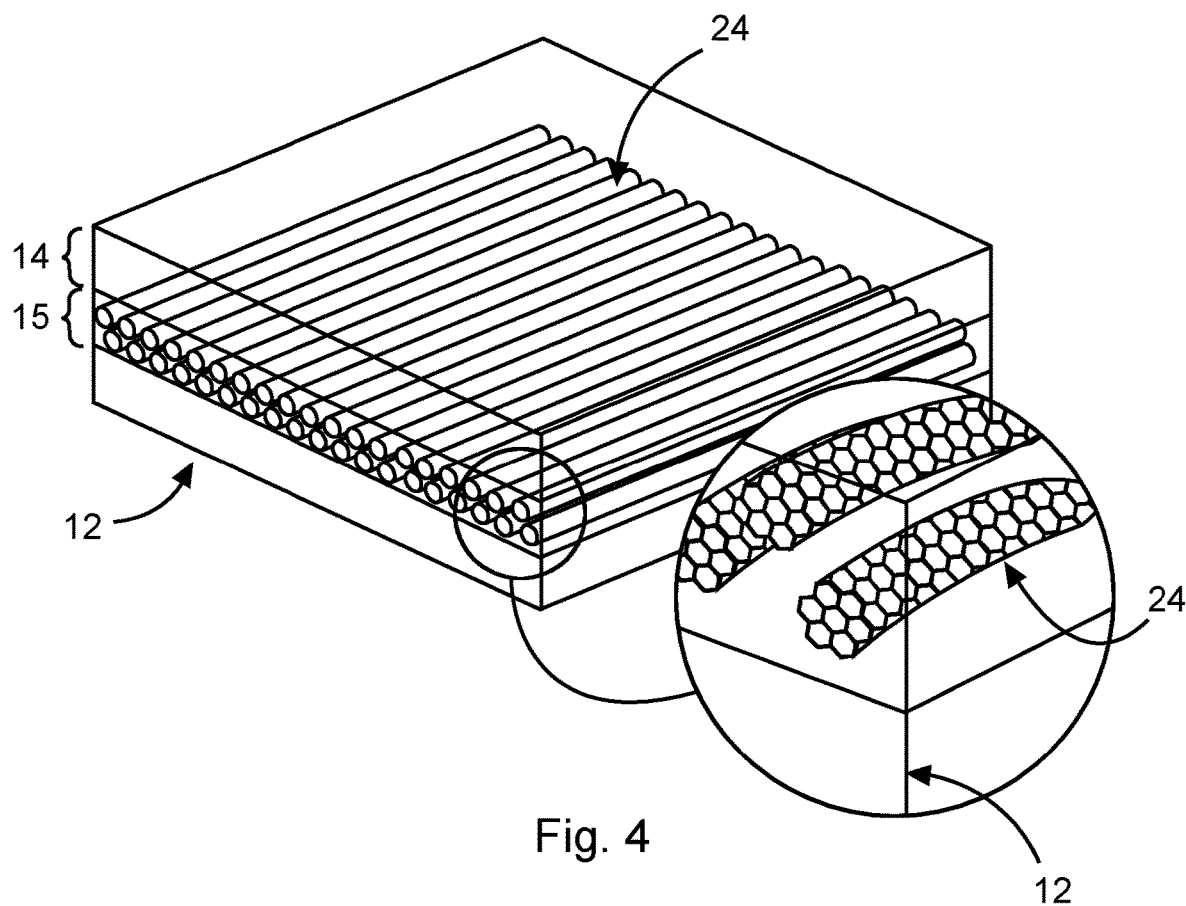
FIG. 4 shows a laminate of CFRP with second CNTs, according to the disclosure herein.

Even though all of the first plurality of CNTs shown in the figures are perpendicular, it has to be noted that the compressive strength is increased with only a percentage of the CNTs being perpendicular FIG. 3 shows the laminate 12 of carbon reinforced plastic, CFRP, according to FIG. 2 with a first outer ply 14 arranged at a first lateral surface 19 of the laminate 12. The consecutive plies may have different material behavior, such as shown in FIG. 4. The first outer ply 14 comprises a first groove 22, wherein the first groove 22 is configured to define a first gas diffusion channel. The first plurality of CNTs 20 extend through the first outer ply 14 in a direction perpendicular to the first lateral surface 19 of the laminate 12. The width and depth of the first groove 14 in relation to the laminate 12 is not true to scale and shows a simplified view with extra large gas diffusion channels for a better understanding.

FIG. 4 shows a laminate 12 of carbon reinforced plastic with a second plurality of carbon nanotubes 24, CNTs, arranged in a first inner ply 15. The first inner ply 15 is arranged beneath the first outer ply 14. The second plurality of CNTs 24 is oriented substantially parallel to the first lateral surface 19 and/or the second lateral surface. The bipolar plates 10, 10' should be highly thermally and electrically conductive for heat transfer across the fuel cell, wherein the bipolar plates 10, 10' need to lead away heat from the electro chemical process. For that purpose, a second inner ply with a third plurality of CNTs (not shown), arranged beneath the first inner ply 15 may be arranged, wherein the structure of the additional ply is substantially identical to the first inner ply 15. The orientation of the third plurality of CNTs may be different to the orientation of the second plurality of CNTs 24. Hereby the heat can be transferred in a desired manner.

Figure 5:
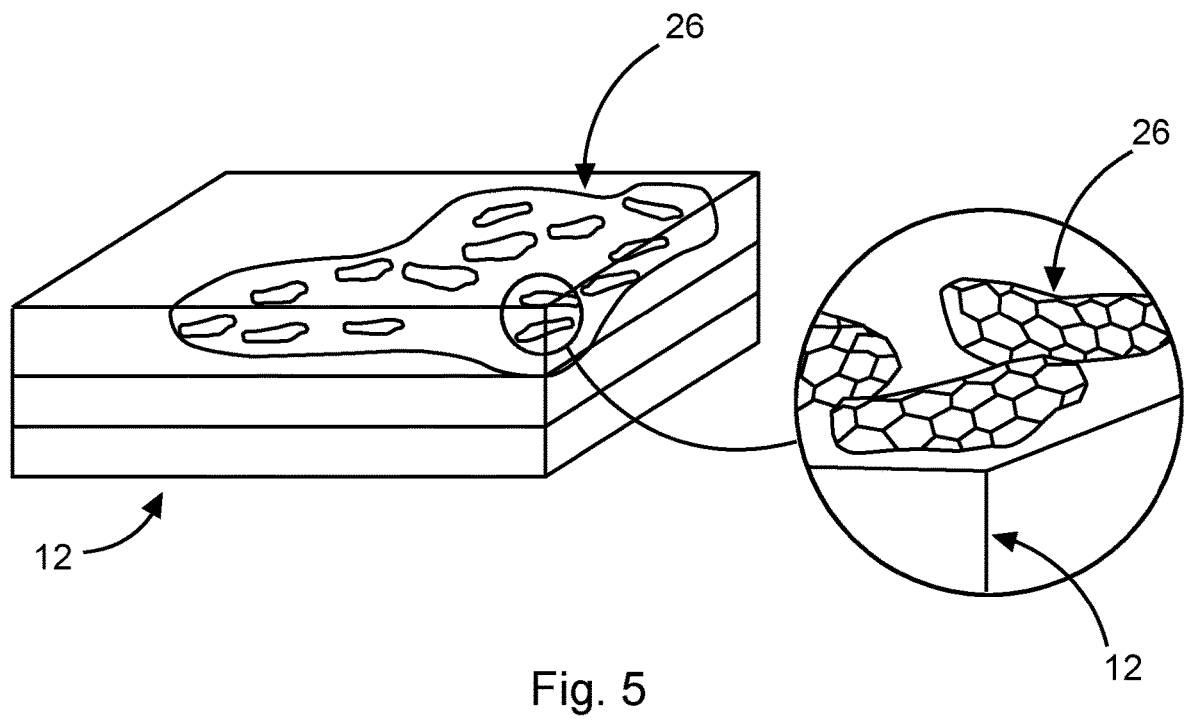
FIG. 5 shows a laminate of CFRP with a graphene enhancement.

FIG. 5 shows a laminate 12 of carbon reinforced plastic, CFRP, with a graphene enhancement 26. Graphene can be applied by different processes, such a spraying mainly on surfaces, or on surfaces of several plies, or mixing it into the resin by dispersion. A particular form of adding graphene is by mixing "graphene flakes" into the resin. If these reach a certain volume percentage, sufficiently many touch each other and thus form a thermally conductive mesh. as can be seen in the enlarged area of FIG. 5. The graphene enhancement 26 increases the electrical and thermal conductivity of the bipolar plates 10, 10' additionally to the second plurality of CNTs.

Figure 6:
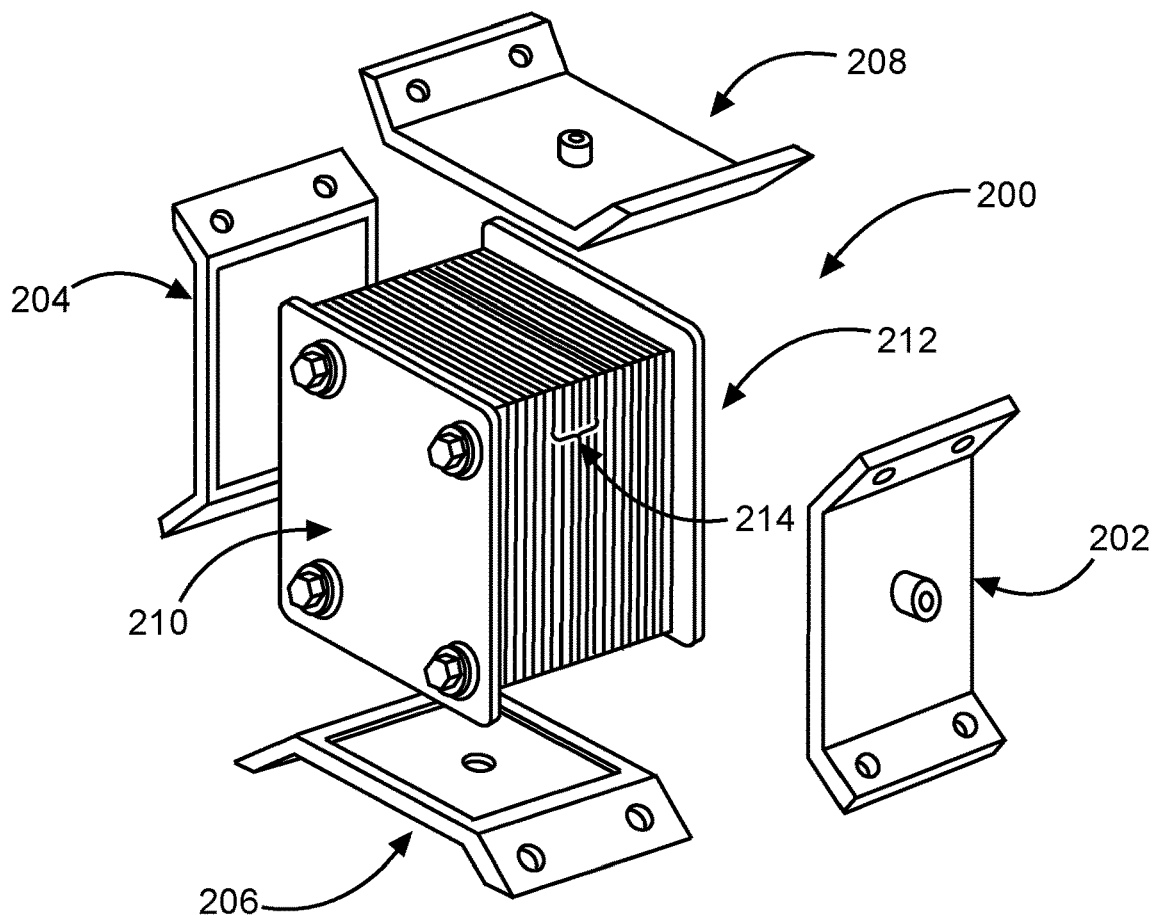
FIG. 6 show a fuel cell stack, according to the disclosure herein.

FIG. 6 shows a fuel cell stack 200, in which several fuel cells 100 are integrated. The fuel cells 100 are switched in "series", and share bipolar plates 10, 10'. The second bipolar plate 10' of a fuel cell is hereby equivalent to the first bipolar plate 10 of a consecutive fuel cell. The fuel cell stack 200 further comprises an inlet manifold 202 for a first reactant, an outlet manifold 204 for the first reactant, an inlet manifold 206 for a second reactant, an outlet manifold 208 for the second reactant, a first end plate 210 and second end plate 212. The first end plate 210 and the second end plate 212 are arranged parallel to the plies of the fuel cell 100 on opposite sides. The inlet manifold 202 and the outlet manifold 204 for the first reactant are arranged at opposing or adjacent sides of the fuel stack 200. The fuel stack 200 is interconnected under compression via through-stack-bolts.

The bipolar plates 10, 10' of the fuel cells 100 fulfil several functions. The incoming reactants are distributed by first 22 and second 26 grooves (not shown), defining the gas diffusion channels. Furthermore, the bipolar plates 10, 10' carry the compressive pressure, due to the fact that the entire fuel cell stack 200 is placed under compression, so as to ensure tightness against gas leakage. The gas diffusion channels cause material to be removed, and the remaining material is therefore subjected to increased pressure. The pressure is directed into the first plurality of CNTs 20 (not shown). Furthermore, the bipolar plates collect the energy generated in the fuel cell stack 200. The heat generated in the fuel cell stack 200 induced by the electrochemical reaction needs to be transported out of the fuel cell stack 200. Additional cooling can be by air, by e.g. cooling flanges, or active, by e.g. cooling channels. In either case, the heat being highest in the centre, needs to be transmitted towards the outer perimeter.

Figure 7:
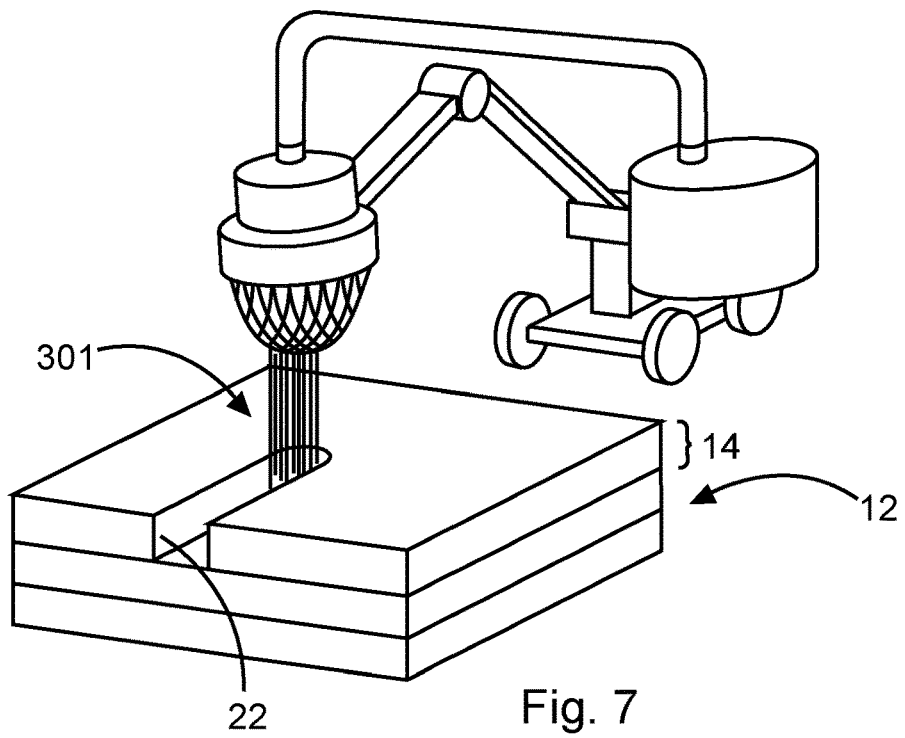
FIG. 7 shows a laser evaporation of a bipolar plate, according to the disclosure herein.

FIG. 7 shows a laser evaporation laminate of CFRP of a bipolar plate. Exact shaping of the laminate can be carried out by high energy laser beam evaporation with a high energy laser 301. The laser 301 evaporates the grooves 22 in the first outer ply 14 of the laminate 12. The intensity of the laser may be varied, since the necessary induced energy for evaporating the carbon fiber 18 (not shown) is higher than the necessary induced energy for evaporating the resin 16 (not shown).

Figure 8:
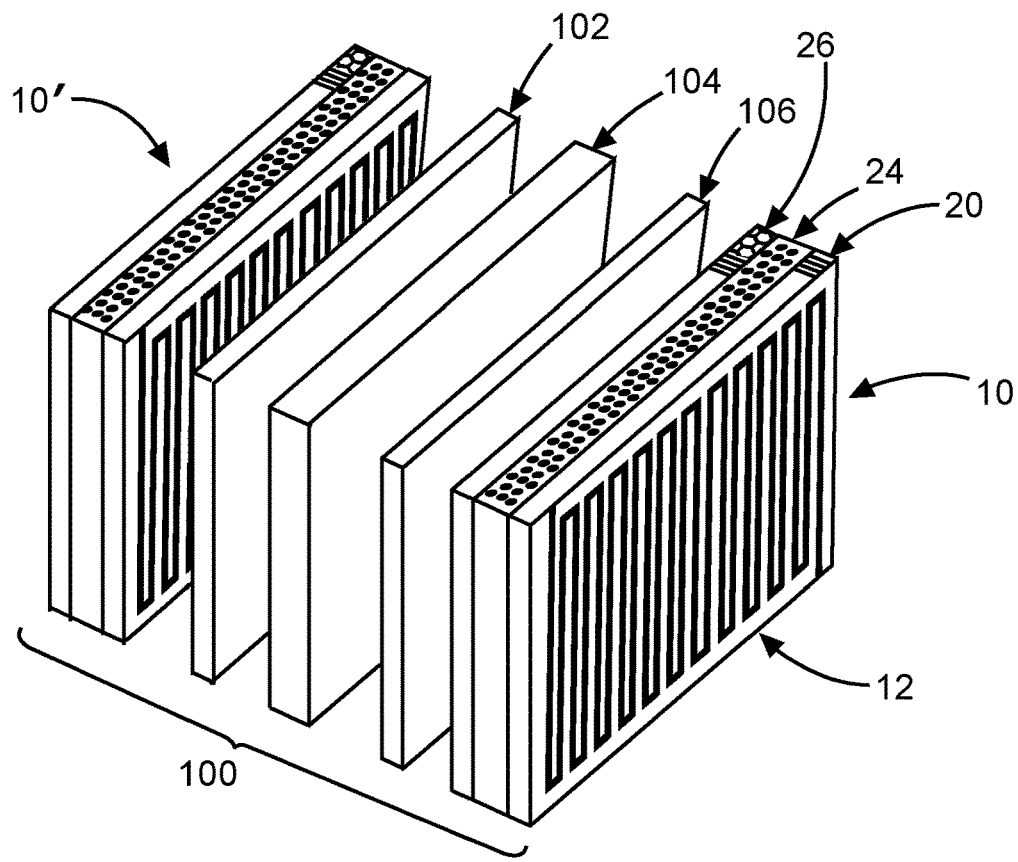
FIG. 8 shows an exploded view of a proton exchange membrane fuel cell, according to the disclosure herein.

FIG. 8 shows an exploded view of a proton membrane fuel cell 100. The fuel cell 100 comprises an anode 102, a membrane 104 and a cathode 106. On the outer sides two bipolar plates 10, 10' comprising a laminate 12 are arranged. The bipolar plates 10, 10' comprise the first groove 22 and the second groove (not shown) and a plurality of first 20 and second 24 CNTs. Furthermore, the bipolar plates comprise a graphene enhancement 26. The course of the first groove 22 is in a serpentine manner.

Figure 9:
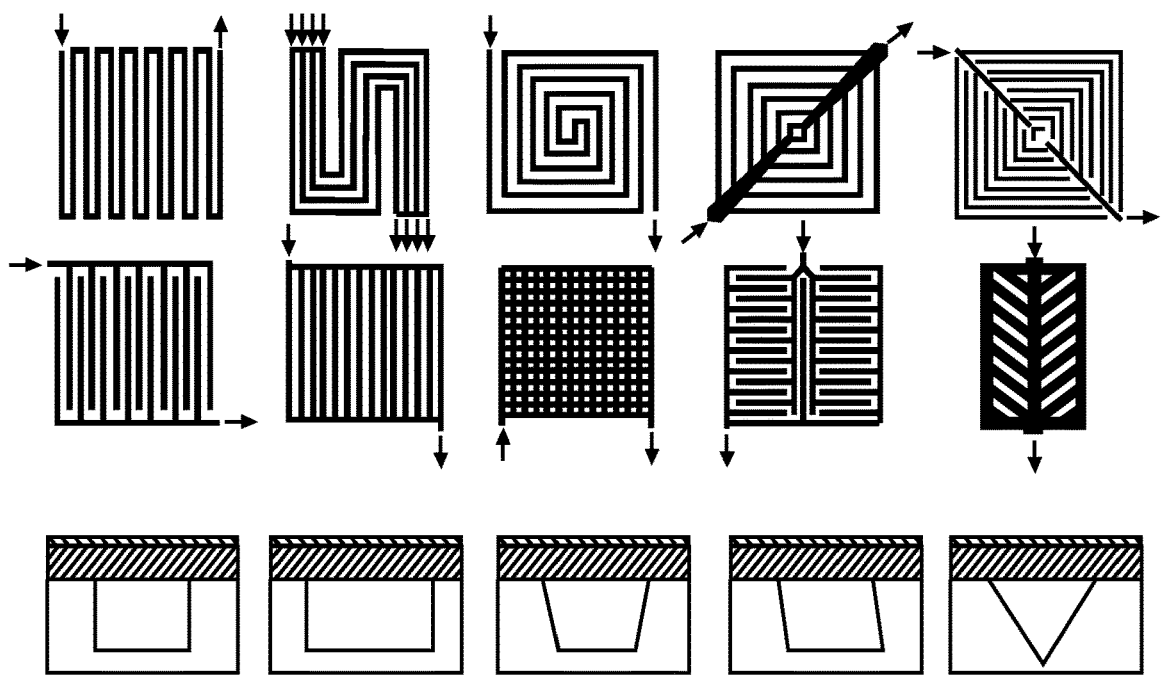
FIG. 9 shows a variety of gas diffusion patterns of a groove of a bipolar plate, according to the disclosure herein.

FIG. 9 shows a variety of gas diffusion patterns of a groove 22, including:

Serpentine, parallel serpentine, spiral serpentine, parallel murray branching, leaf-like interdigitated, interdigitated, parallel, parallel, grid, lounge-like interdigitated, leaf like.

Square, rectangular, trapezoidal, parallelogram, triangular.

Figure 10:
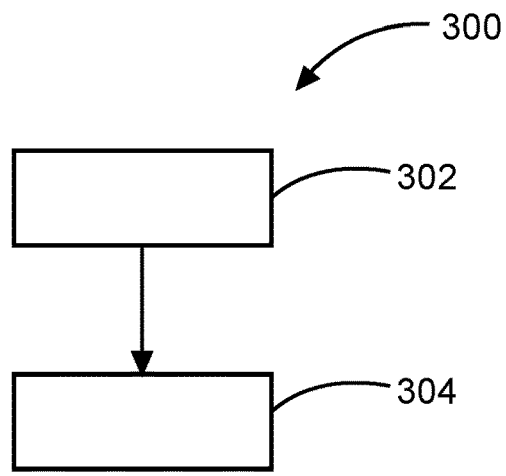
FIG. 10 shows a method, according to the disclosure herein.

FIG. 10 shows a method 300 for manufacturing a bipolar plate 10 for a proton exchange membrane fuel cell 100. The method 300 comprises the following steps. In a first step 302 a laminate 12 of a carbon fiber reinforced plastic, CFRP, comprising a resin 16, a plurality of carbon fibers 18 and a first plurality of CNTs 20, is provided. The laminate 12 further comprises a first outer ply 14 with a first lateral surface 18, wherein at least some of the first plurality of CNTs 20 extend through the first outer ply 14 in a direction transversely to the first lateral surface 18 of the laminate 12. In a second step 304 a laser is used to evaporate the first outer ply 14 to form a first groove (12) defining a gas diffusion channel.

Figure 11:
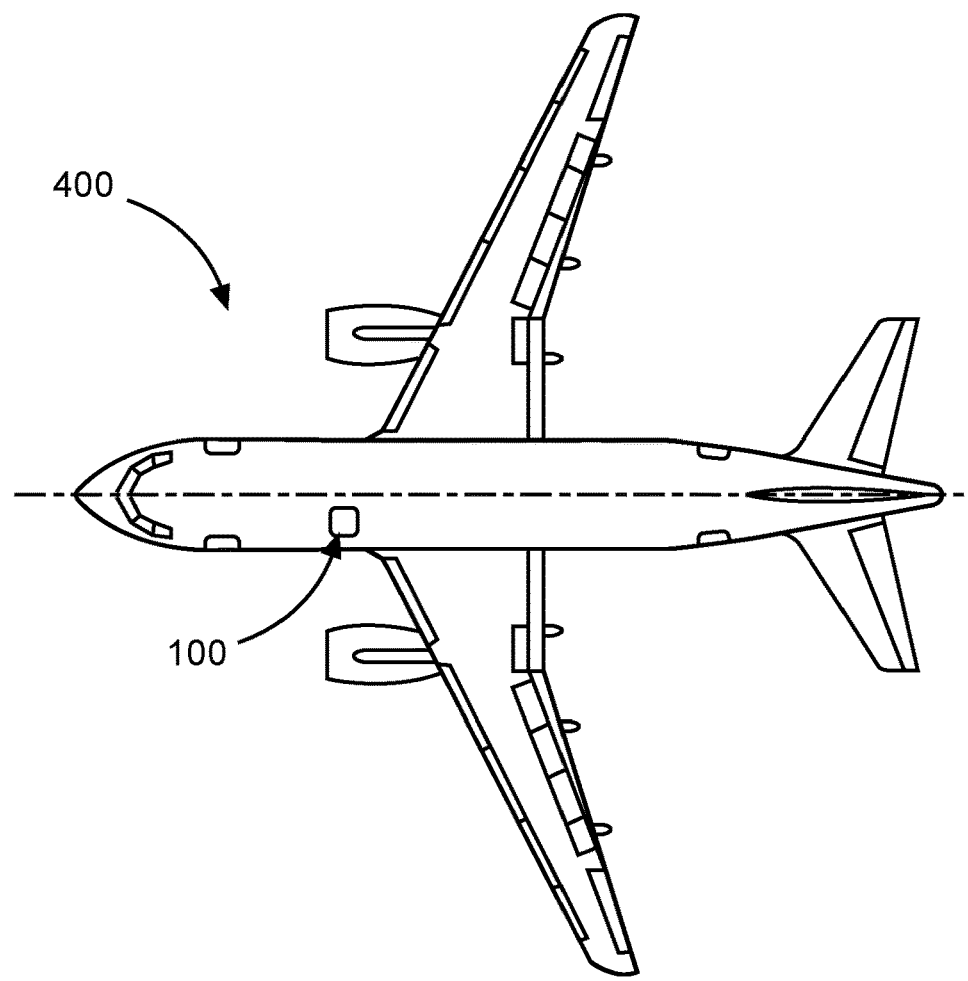
FIG. 11 shows an aircraft, according to the disclosure herein.

FIG. 11 shows an aircraft 400 with a fuel cell 100. The aircraft may also be a helicopter, a drone or the like.

It is noted that embodiments of the disclosure herein are described with reference to different subject matters. In particular, some embodiments are described with reference to methods whereas other embodiments are described with reference to devices. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure herein has been illustrated and described in detail in the drawings and foregoing description, such illustration and description are to be considered illustrative or exemplary and not restrictive. The disclosure herein is not limited to the disclosed embodiments. Other variations to the disclosed embodiments can be understood and effected by those skilled in the art in practicing a disclosure herein, from a study of the drawings, and the disclosure.

As used herein, the word "comprising" does not exclude other elements or steps, and the indefinite article "a" or "an" does not exclude a plurality. A single device or other unit may fulfil the functions of several items. The mere fact that certain measures are re-cited in mutually different dependent claims does not indicate that a combination of these measures cannot be used to advantage. Any reference signs in the claims should not be construed as limiting the scope.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 10, 10' Bipolar plate
12 Laminate
14 First outer ply
15 First inner ply
16 Resin
18 Carbon fibers
19 First lateral surface
20 First plurality of carbon nanotubes
22 First groove
23 Second groove
24 Second plurality of carbon nanotubes
100 Proton exchange membrane fuel cell
102 Anode
104 Membrane
106 Cathode
110 Conductor
112 Consumer
200 Fuel cell stack
202 Inlet manifold for a first reactant
204 Outlet manifold for a first reactant
206 Inlet manifold for a second reactant
208 Outlet manifold for a second reactant
210 First end plate
212 Second end plate
300 Method for manufacturing a bipolar plate
301 Laser
302 Step of providing a laminate
304 Step of evaporating the laminate
400 Aircraft

The invention claimed is:

1. A bipolar plate for a proton exchange membrane fuel cell, comprising:
a laminate of carbon fiber reinforced plastic (CFRP) with a first outer ply, and wherein the CFRP comprises a resin and a plurality of carbon fibers;
the first outer ply being arranged at a first lateral surface of the laminate;
the laminate comprising a first plurality of carbon nanotubes (CNTs);
the first outer ply comprising a first groove, wherein the first groove is configured to define a first gas diffusion channel; and
at least some of the first plurality of CNTs extending through the first outer ply in a direction transversely to the first lateral surface of the laminate.

2. The bipolar plate for a proton exchange membrane fuel cell according to claim 1, wherein the laminate comprises a second outer ply,
wherein the second outer ply is at a second lateral surface of the laminate,
wherein the second outer ply comprises a second groove configured to define a second gas diffusion channel, and
wherein at least some of the first plurality of CNTs extend through the second outer ply in a direction transversely to the second lateral surface of the laminate.

3. The bipolar plate for a proton exchange membrane fuel cell according to claim 2, wherein at least some of the plurality of CNTs extend to the first lateral surface and/or the second lateral surface of the laminate.

4. The bipolar plate for a proton exchange membrane fuel cell according to claim 1, wherein a length of at least some of the plurality of CNTs correspond to depth of the first groove and/or the second groove.

5. The bipolar plate for a proton exchange membrane fuel cell according to claim 1, wherein at least some of the first plurality of CNTs extend through the first outer ply and/or the second outer ply in a direction perpendicular to the first lateral surface and/or the second lateral surface of the laminate.

6. The bipolar plate for a proton exchange membrane fuel cell according to claim 1,
wherein the laminate further comprises a second plurality of CNTs, and
wherein the second plurality of CNTs is oriented substantially parallel to the first lateral surface and/or the second lateral surface.

7. The bipolar plate for a proton exchange membrane fuel cell according to claim 1,
wherein the laminate further comprises a third plurality of CNTs,
wherein the third plurality of CNTs is oriented substantially parallel to the first lateral surface and/or the second lateral surface of the laminate, and
wherein an orientation of the third plurality of CNTs is different to an orientation of the second plurality of CNTs.

8. The bipolar plate for a proton exchange membrane fuel cell according to claim 1, wherein the bipolar plate further comprises a graphene enhancement carried out by spraying, dispersing or by mixing graphene flakes into the resin.

9. The bipolar plate for a proton exchange membrane fuel cell according to claim 1, wherein the first groove and/or the second groove runs in a serpentine manner.

10. The bipolar plate for a proton exchange membrane fuel cell according to claim 1, wherein a cross-section of the first groove or the second groove is selected from the group consisting of square, rectangular, trapezoidal, parallelogram, and triangular.

11. A proton exchange membrane fuel cell, comprising:
an anode;
a membrane;
a cathode; and
a first and a second bipolar plate each comprising:
a laminate of carbon fiber reinforced plastic (CFRP) with a first outer ply, and wherein the CFRP comprises a resin and a plurality of carbon fibers;
the first outer ply being arranged at a first lateral surface of the laminate;
the laminate comprising a first plurality of carbon nanotubes (CNTs);
the first outer ply comprising a first groove, wherein the first groove is configured to define a first gas diffusion channel; and
at least some of the first plurality of CNTs extending through the first outer ply in a direction transversely to the first lateral surface of the laminate;
wherein the anode and the cathode are connected via a conductor, wherein the conductor is connectable to a consumer or an element for storing electrical energy, and
wherein the first bipolar plate is configured to guide a first reactant to the anode, and the second bipolar plate is configured to guide a second reactant to the cathode, such that the first reactant and the second reactant react via the membrane by generating electrical energy.

12. A fuel cell stack comprising:
a plurality of proton exchange membrane fuel cells according to claim 11, wherein the second bipolar plate of a fuel cell is equivalent to the first bipolar plate of a consecutive fuel cell;
an inlet manifold for a first reactant;
an outlet manifold for the first reactant;
an inlet manifold for a second reactant;
an outlet manifold for the second reactant; and
a first end plate and second end plate;
  wherein the first end plate and the second end plate are arranged parallel to the plies of the fuel cell on opposite sides,
  wherein the inlet manifold and the outlet manifold for the first reactant are arranged at opposing or adjacent sides of the fuel stack, and
  wherein the fuel stack is interconnected under compression.

13. The fuel cell stack according to claim 12, wherein the manifolds comprise a plurality of entries.

14. A method for manufacturing a bipolar plate for a proton exchange membrane fuel cell according to claim 1, comprising:
  providing a laminate of a carbon fiber reinforced plastic (CFRP) comprising a resin, a plurality of carbon fibers and a first plurality of CNTs;
  the laminate further comprising a first outer ply with a first lateral surface, wherein at least some of the first plurality of CNTs extend through the first outer ply in a direction transversely to the first lateral surface of the laminate; and
  using a laser to evaporate the first outer ply to form a first groove defining a gas diffusion channel.

15. An aircraft comprising a fuel cell according to claim 11.

* * * * *